Figure 1:
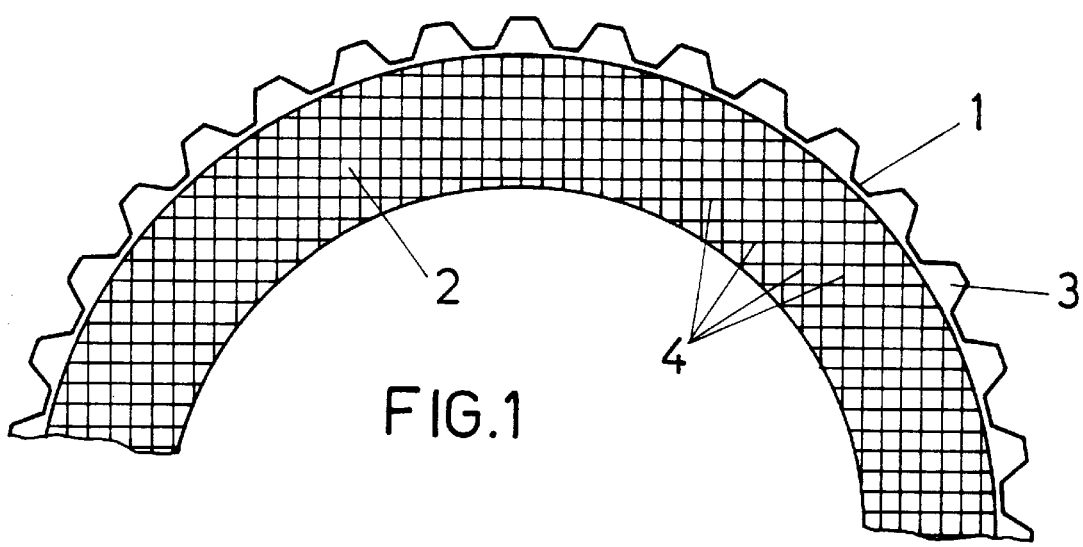

United States Patent [19]
Kremsmair et al.

[11] Patent Number: 6,105,234
[45] Date of Patent: *Aug. 22, 2000

[54] METHOD OF PRODUCING A FLAT FRICTION DISK

[75] Inventors: Christian Kremsmair, Vorchdorf; Gerhard Hartner, Bad Wimsbach-Neydharting; Johann Hartner, Laakirchen; Bruno Bürtlmair, Vöcklamarkt; Klaus-Peter Lassl, Vorchdorf, all of Germany

[73] Assignee: Miba Frictec GmbH, Laakirchen, Austria

[*] Notice: This patent issued on a continued prosecution application filed under 37 CFR 1.53(d), and is subject to the twenty year patent term provisions of 35 U.S.C. 154(a)(2).

[21] Appl. No.: 08/790,442

[22] Filed: Jan. 29, 1997

[30] Foreign Application Priority Data

Feb. 14, 1996 [AT] Austria ........................................ 255/96

[51] Int. Cl.⁷ ...................................................... B23P 15/00
[52] U.S. Cl. ........................ 29/521; 188/218 XL; 403/281
[58] Field of Search .............. 29/521, 505; 188/218 XL; 403/281, 279, 276

[56] References Cited

U.S. PATENT DOCUMENTS

| | | | |
|---|---|---|---|
| 2,707,825 | 5/1955 | Sowter | 29/521 X |
| 3,280,772 | 10/1966 | Burklo | 29/521 |
| 3,287,872 | 11/1966 | Focht | 29/521 X |
| 4,280,609 | 7/1981 | Cruise | 188/218 XL |
| 4,723,783 | 2/1988 | Belter et al. | 29/521 X |
| 4,995,500 | 2/1991 | Payvar | 188/218 XL |
| 5,007,166 | 4/1991 | Erb | 29/521 X |

FOREIGN PATENT DOCUMENTS

| | | |
|---|---|---|
| 281 443 | 5/1970 | Austria . |
| 385 826 | 5/1988 | Austria . |
| 0 280 201 | 8/1988 | European Pat. Off. . |
| 0 280 202 | 8/1988 | European Pat. Off. . |
| 0 393 011 | 10/1990 | European Pat. Off. . |
| 38 43 901 | 6/1990 | Germany . |
| 43 40 464 | 6/1994 | Germany . |

*Primary Examiner*—Irene Cuda
*Attorney, Agent, or Firm*—Collard & Roe, P.C.

[57] ABSTRACT

There is described a method of producing a flat friction disk, where first of all a sintered friction lining is applied onto a flat steel disk (1) and is then sintered, before the sintered friction lining (2) is compacted and sized by simultaneously pressing grooves (4) into the same. For simplifying the production method it is proposed that upon sizing the friction disk localized recesses (5) should be pressed into the steel disk (1) over its surface through the sintered friction lining (2).

7 Claims, 1 Drawing Sheet

METHOD OF PRODUCING A FLAT FRICTION DISK

This invention relates to a method of producing a flat friction disk, where a sintered friction lining is first applied onto a flat steel disk and then sintered before the sintered friction lining is compacted and sized by simultaneously pressing grooves into the same.

For producing friction disks with a sintered friction lining the steel supports receiving the friction lining are usually degreased first of all and are then sprinkled with a dosed pulverized binder and the friction lining powder, before the friction lining applied onto the steel disk is sintered, for instance in a conveyor furnace under a reducing gas atmosphere. For the case that the friction disk should have a friction lining on both sides, the friction lining should be sintered onto the one side of the steel disk and then a scatter-sintered friction lining should be provided on the other side in the same way. After the sintering operation, the sintered friction linings are compacted by cold pressing, and at the same time the grooves required for the discharge of oil are pressed into the friction lining. Despite this pressing operation, where the friction disk is pressed flat, the deformations of the steel disk, which occur in the heat treatment during the sintering operation, cannot be compensated, so that a further heat treatment is performed by applying pressure in a hood-type furnace, before the friction disks are sized to their final dimensions by a final cold pressing operation. However, the additional dressing operation connected with a heat and pressure treatment, which is necessary to ensure a flatness of the friction disks that also meets higher requirements, makes the above-described production method rather complex.

It is therefore the object underlying the invention to develop a method as described above such that the additional dressing operation can be omitted due to a subsequent heat and pressure treatment of the sintered friction disk, without having to accept losses as regards the flatness and the accuracy of the friction disks.

This object is solved by the invention in that during sizing of the friction disk, localized recesses distributed over the steel disk surface are pressed into the steel disk surface through the sintered friction lining.

The cold forming of the steel disk effected when pressing the recesses into the same provides for a sufficient dimensional stability of the friction disk due to its compaction, so as to largely maintain the flatness of the friction disk achieved when pressing the same flat as a result of sizing. There must merely be ensured a corresponding distribution of the recesses over the surface of the steel disk. Due to the localized arrangement of the recesses, the effect of the sintered friction lining is not influenced by the recesses pressed into the steel disk through the sintered friction lining. It should merely be made sure that the recesses, which are pressed into the steel disk through the sintered friction lining without perforating the sintered friction lining, do not locally impair the adhesion between the friction lining and the steel disk and become the starting point for a separation of the lining. It is therefore recommended to exclusively press the recesses through the groove bottom adjacent the friction lining and not to provide recesses between the grooves adjacent the friction lining. Moreover, the additional recesses increase the groove volume of the friction surface, which has a favorable influence particularly on the thermal stability of the friction disk.

Particularly advantageous conditions can be achieved when the recesses are pressed into the steel disk together with pressing the grooves into the sintered friction lining. This measure not only renders superfluous a separate operating cycle for pressing the recesses into the steel disk, but also improves the dimensional stability of the friction lining itself. When pressing the grooves into the sintered friction lining, the remaining friction lining is compacted at the same time. Since in this case the pressing tool is supported at the steel disk itself with its protruding tabs for making the recesses, there is achieved a fixed allocation between the steel disk and the pressing tool, which is otherwise not the case in friction disks with friction linings on both sides. The thickness of the friction lining and thus the porosity of the lining can therefore be adjusted very precisely.

To achieve a rather uniform compaction of the steel disk despite the localized recesses, it is recommended to press the recesses into the steel disk from both sides, even if the steel disk has a sintered friction lining on one side only. The recesses need by no means be disposed opposite each other, but may be offset with respect to the recesses on the other side. The penetration depth depends on the conditions, but should in general be not more than one third of the thickness of the steel disks. The shape of the recesses may be selected differently. It should, however, be made sure that the lateral flow of material, which occurs when making the recesses, is as little impeded as possible. When conical or pyramidal recesses are pressed into the steel disk, these requirements are advantageously taken into consideration. Whether instead of the conical or pyramidal recesses those based on a truncated cone or a truncated pyramid are used, plays a minor role, as the apices and edges are rounded off anyway.

Figure 2:
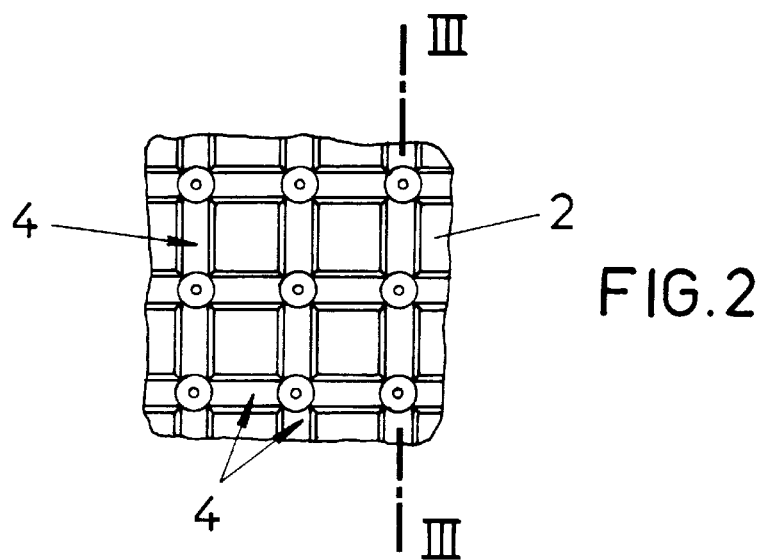
Figure 3:
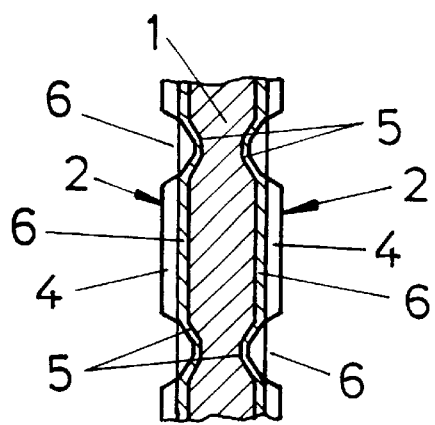
Figure 4:
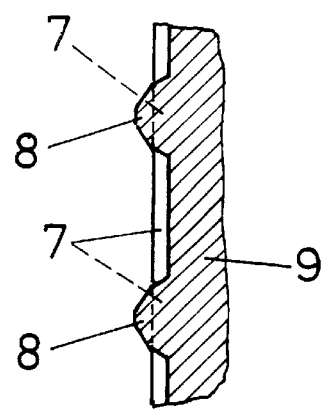

The inventive method will now be explained in detail with reference to the drawing, wherein:

FIG. 1 shows segments of a friction disk to be produced in a simplified top view, FIG. 2 shows a top view of a sintered friction lining produced in accordance with the inventive method on an enlarged scale, FIG. 3 shows a section along line III—III of FIG. 2 on an enlarged scale, and FIG. 4 shows segments of a pressing tool that can be used for producing a friction lining in accordance with FIG. 3.

The friction disk in accordance with the illustrated embodiment consists of a steel disk 1 as support for a sintered friction lining 2, which has been applied on both sides on the annular steel disk 1, except for peripheral teeth 3. The sintered friction powder is first of all sprinkled onto the one side of the degreased steel disk 1 in a conventional way by covering the peripheral teeth 3, and the subsequent sintering is commonly performed in a conveyor furnace under a reducing gas atmosphere. The application of the friction lining on the opposite side of the steel disk 1 is effected analogously. The steel disk 1 thus provided on both sides with sintered friction linings 2 is then subjected to a pressing and sizing operation, where not only the friction lining is compacted in a known manner and provided with grooves 4 for the discharge of oil, but the steel disk 1 is also subjected to a cold forming operation, namely by pressing localized recesses 5 into the groove bottom 6, as this is particularly clearly shown in FIG. 3. In accordance with FIG. 4, these recesses are produced by means of, for instance conical, tabs 8 of the pressing tool 9, which protrude beyond the webs 7 for making the grooves 4, when the friction disk is clamped between two such pressing tools. Whereas the friction lining 2 is merely compacted more adjacent the webs 7 than over the remaining surface, without deforming the steel disk 1, the steel disk 1 is provided with recesses 5 adjacent the tabs 8 through the groove bottom 6, which provides for a cold forming of the steel disk 1 at recesses 5 and thus a corresponding cold compaction, so that the sizing achieved during this pressing operation including the flatness of the steel disk are largely maintained even after the decrease in pressure. By means of the pressing operation for the compaction of the lining and the making of the grooves 4, the final dimensions of the friction disk can thus already be made within close tolerances. Since the pressing tools 9 provided on both sides are supported on the steel disk 1 itself by means of the tabs 8—the groove bottom 6 highly compacted in this area and formed by the friction lining can be neglected in this connection—, there is in addition achieved a high dimensional stability for the sintered friction linings 2 themselves provided on both sides, which has an advantageous effect on the maintenance of a certain porosity of the friction lining 2, and thus on its friction properties.

What is claimed is:

1. A method of producing a friction disk, consisting of the steps:

providing a steel disk having a thickness, a central plane and a planar surface;

applying a sintered friction lining to said planar surface;

providing a pressing tool having a surface with:
 (i) a series of ridges extending from the surface a first distance, wherein each of the ridges includes a central axis, respectively, and the first distance is measured orthogonally to the central axis; and
 (ii) a plurality of projections extending from the surface a second distance that is measured orthogonally to the central axis of each ridge and is greater than the first distance, wherein each of the plurality of projections has a central axis that extends orthogonally to the central axis of each ridge and intersects at least one of the central axes of the series of ridges, respectively; and forcing said pressing tool against said planar surface of said disk without application of heat, thereby maintaining said planar surface while causing:
 (i) each of said plurality of projections to deform a corresponding portion of said sintered friction lining and said steel disk into a localized recess having a bottom and a closed peripheral surface respectively, without causing any of said plurality of projections from penetrating through said sintered friction lining;
 (ii) each of said series of ridges to deform a corresponding portion of said sintered friction lining and said steel disk into a groove having a bottom, respectively, wherein each of the localized recesses extends from the bottom of at least one of the grooves, respectively, towards the central plane of the disk; and
 (iii) said surface of said pressing tool to compact said sintered friction lining.

2. The method according to claim 1, wherein the bottom of each localized recess is spaced from said planar surface of said steel disk a distance that is no more than one-third the thickness of said steel disk.

3. The method according to claim 1, wherein each of the plurality of projections has a conical configuration, whereby the forcing step results in each localized recess having a corresponding conical configuration.

4. The method according to claim 1, wherein each of the plurality of projections has a pyramidal configuration, whereby the forcing step results in each localized recess having a corresponding pyramidal configuration.

5. A method of producing a friction disk, consisting of the steps:

providing a steel disk having a thickness, a central plane and a first planar surface, and a second planar surface;

applying a sintered friction lining to each of said first planar surface, and said second planar surface;

providing a pressing tool having a surface with:
 (i) a series of ridges extending from the surface a first distance, wherein each of the ridges includes a central axis, respectively, and the first distance is measured orthogonally to the central axis; and
 (ii) a plurality of projections extending from the surface a second distance that is measured orthogonally to the central axis of each ridge and is greater than the first distance, wherein each of the plurality of projections has a central axis that extends orthogonally to the central axis of each ridge and intersects at least one of the central axes of the series of ridges, respectively; and forcing said pressing tool against each of said first planar surface and said second planar surface of said disk without application of heat, thereby maintaining each planar surface while causing:
 (i) each of said plurality of projections to deform a corresponding portion of said sintered friction lining and said steel disk into a localized recess having a bottom and a closed peripheral surface, respectively, without causing any of said plurality of projections from penetrating through said sintered friction lining;
 (ii) each of said series of ridges to deform a corresponding portion of said sintered friction lining and said steel disk into a groove having a bottom, respectively, wherein each of the localized recesses extends from the bottom of at least one of the grooves, respectively, towards the central plane of the disk; and
 (iii) said surface of said pressing tool to compact said sintered friction lining.

6. The method according to claim 5, wherein the bottom of each localized recess is spaced from said planar surface of said steel disk a distance that is no more than one-third the thickness of said steel disk.

7. The method according to claim 5, wherein each of the plurality of projections has a configuration selected from the group consisting of conical and pyramidal, whereby the forcing step results in each localized recess having a corresponding configuration.

* * * * *

UNITED STATES PATENT AND TRADEMARK OFFICE
CERTIFICATE OF CORRECTION

PATENT NO. : 6,105,234
DATED : August 22, 2000
INVENTOR(S) : KREMSMAIR ET AL-2

It is certified that error appears in the above-identified patent and that said Letters Patent is hereby corrected as shown below:

On the title page, column 1, line 6 of Item [75], please change "all of Germany" to read:

--all of Austria--.

Signed and Sealed this

Twenty-fourth Day of April, 2001

*Attest:*

NICHOLAS P. GODICI

*Attesting Officer*  *Acting Director of the United States Patent and Trademark Office*